United States Patent [19]

Fuchigami et al.

[11] Patent Number: 4,783,211
[45] Date of Patent: Nov. 8, 1988

[54] APPARATUS FOR LOCALLY HEATING CONVEYED GLASS SHEETS

[75] Inventors: Yasuhiro Fuchigami; Atsushi Okai; Kazuo Yamada, all of Osaka, Japan

[73] Assignee: Nippon Sheet Glass Co., Ltd., Osaka, Japan

[21] Appl. No.: 132,467

[22] Filed: Dec. 14, 1987

[30] Foreign Application Priority Data

Dec. 15, 1986 [JP] Japan .............. 61-192685[U]

[51] Int. Cl.⁴ .................................. C03B 23/02
[52] U.S. Cl. ................................ 65/162; 65/104; 65/106; 65/273; 65/287
[58] Field of Search ............. 65/273, 107, 106, 160, 65/162, 287, 104, DIG. 13

[56] References Cited

U.S. PATENT DOCUMENTS

| | | | |
|---|---|---|---|
| 2,671,987 | 3/1954 | Jendrisak | 65/273 X |
| 2,794,300 | 6/1957 | Golightly | 65/273 X |
| 3,273,988 | 9/1966 | Dean et al. | 65/152 |
| 3,340,037 | 9/1967 | Stevenson | 65/107 X |
| 3,457,060 | 7/1969 | Leflet, Jr. et al. | 65/107 X |
| 4,441,907 | 4/1984 | Nitschke | 65/288 X |
| 4,726,832 | 2/1988 | Kajii et al. | 65/273 |

FOREIGN PATENT DOCUMENTS 45-28911 9/1945 Japan .
54-60314 5/1954 Japan .

Primary Examiner—Arthur Kellog
Attorney, Agent, or Firm—Bogucki, Scherlacher, Mok & Roth

[57] ABSTRACT

There is disclosed an improved apparatus for locally heating selected portions of glass sheets conveyed through a tunnel type furnace on a roller conveyor. The apparatus comprises two localized heaters positioned within the furnace, supporting members for supporting the localized heaters, at least one portion of each of the supporting members extending into the furnace, and a drive mechanism positioned externally of the furnace and adapted to reciprocatingly moving the localized heaters in a direction transversely to the direction of conveyance of the glass sheets in a substantially synchronized relation to movement of the conveyed glass sheets so that the selected portions of the glass sheets are locally heated by the localized heaters and can thereafter be bent, at a bending station, to a much smaller radius of curvature than the rest of the glass sheet.

4 Claims, 3 Drawing Sheets

APPARATUS FOR LOCALLY HEATING CONVEYED GLASS SHEETS

BACKGROUND OF THE INVENTION

1. Field of the Invention

The present invention relates generally to a glass sheet heating system and more particularly to an improvement in an apparatus for locally heating selected portions of glass sheets at a higher temperature than the rest of the same.

2. Description of the Related Art

Shaped or curved glass sheets are widely used as windshields as well as rear windows in automotive vehicles. Manufacture of such shaped glass sheets typically includes heating flat sheets to the softening points of the glass, shaping the heated sheets to a desired curvature, and then cooling the bent sheets to a temperature below the annealing range of the glass. The last step or cooling should be swiflty effected to temper the glass sheets to increase the mechanical strength as well as the resistance to breakage. This tempering also causes the glass sheets to fracture into relatively small and smoothly surfaced fragments, rather than jagged fragments, upon damages resulting from impact.

Flat glass sheets must be shaped to precisely defined curvature dictated by the shape and outline of the frames of vehicle windows, and it is often required that some portions of the glass sheets be bent with a much smaller radius of curvature than that of the remaining portion of the glass sheets. To meet this requirement, it is necessary to heat some particular portions of the glass sheets at a higher temperature than the rest of the same.

U.S. Pat. No. 3,273,988 issued to Dean et al discloses stationary auxiliary burners positioned to provide localized heating of the peripheral edges of glass sheets. The only type of localized heat is, however, a strip along the direction of conveyance of the glass sheets.

Japanese laid-open patent publication No. 54/60314 discloses an apparatus for bending glass sheets. The disclosed apparatus includes a furnace in which burners are suspended for reciprocating motion to locally heat straight side edges of a sheet of glass placed on a bending mold. The localized heat is thus limited to two parallel straight lines.

U.S. Pat. No. 4,441,907 issued to Nitschke discloses an apparatus for providing localized heating of the curved edges of a glass sheet. The patented apparatus includes a pair of elongated gas burners positioned to locally heat designated portions of glass sheet as they are heated while being conveyed through a furnace on a horizontal roller conveyor. These localized heaters are mounted on a carriage driven by a drive mechanism. The drive mechanism causes the carriage to move in a direction parallel to the direction of conveyance of the glass sheet in order to provide continuous heating of the designated portions of the glass sheet between an upstream position and a downstream position of the carriage. At this time, the carriage is driven downstream in unison with movement of the glass sheet. After the carraige reaches its downstream position, the drive mechanism causes the carriage to return to its upstream position in preparation for another cycle. There are a few disadvantages to this particular localized heater. First, there must be formed at one side of the furnace a relatively large horizontally extending opening through which the localized heaters are connected to the carriage movable along the exterior path. Formation of this opening results in a great amount of heat loss within the furnace. Secondly, the carriage has to be returned to its original or upstream position for the next cycle after it reaches its downstream position. This reciprocating movement of the carriage will substantially slow down the operation cycle of thermal treatment to the glass sheet.

SUMMARY OF THE INVENTION

It is an object of this invention to provide a glass sheet heating system which may effectively provide localized heating of selected portions of glass sheets without significantly heating the rest of the glass sheets.

Another object of this invention is to provide an improved apparatus including a plurality of localized heaters movable in a direction transversely to the direction of conveyance of glass sheets in order to locally heat selected portions of the glass sheets, so that the selected portions of the glass sheets can thereafter be bent to a much smaller radius of curvature than that of the rest of the glass sheet.

According to one aspect of the present invention, in a glass sheet heating system including a furnace adapted to heat glass sheets to its deformation temperature, and means for conveying the glass sheets through the furnace, the improvement comprises one or more heaters positioned within the furnace, and means for reciprocatingly moving the heaters in a direction transversely to the direction of conveyance of the glass sheets in a substantially synchronized relation to movement of the conveyed glass sheets, so that selected portions of the glass sheets are locally heated by the heaters.

According to another aspect of the invention, in a glass sheet heating system including a furnace through which a series of glass sheets are conveyed on a horizontal roller conveyor and are heated to its deformation temperature, the improvement comprises one or more elongated heaters positioned within the furnace, supporting members extending into the furnace and supporting the elongated heaters and means for reciprocally moving the elongated heaters supported by the supporting members in a direction transversely to the direction of conveyance of a glass sheet in a synchronized relation to movement of the conveyed glass sheets, so that selected portions of the glass sheets are locally heated at a higher temperature than the rest of the glass sheets.

Also, according to this invention, there is provided an improved apparatus for locally heating selected portions of glass sheets conveyed through a furnace, which comprises one or more localized heaters positioned within the furnace, supporting members for supporting the localized heaters, at least one portion of each of the supporting members extending into the furnace, and means positioned externally of the furnace and for reciprocatingly moving said localized heaters supported by the supporting members in a direction transversely to the direction of conveyance of the glass sheets in a substantially synchronized relation to movement of the conveyed glass sheets, so that the selected portions of the glass sheets are locally heated by the localized heaters.

Preferably, a localized heater is provided for each portion of the glass sheet which is to be bent substantially more than the rest of the glass sheet.

Other objects, features and advantages of the present invention will become more apparent upon a reading of

DESCRIPTION OF THE PREFERRED EMBODIMENTS

Figure 1:
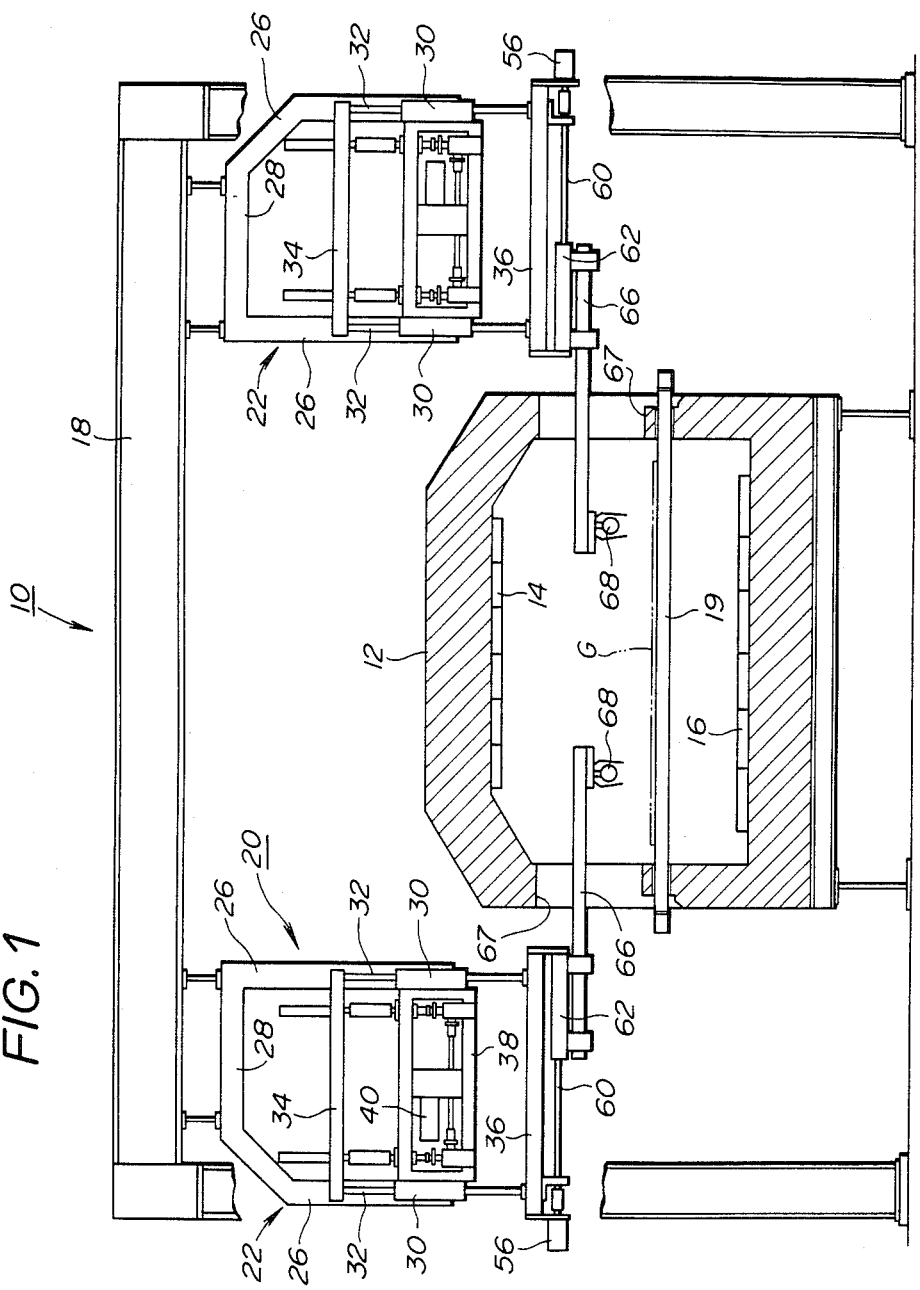
FIG. 1 is a transverse section of a glass sheet heating system constructed according to the teaching of the present invention.

With now reference to the drawings and particularly to FIG. 1, there is shown a glass sheet heating system 10 including a tunnel type furnace 12 having a plurality of upper and lower electric heaters 14, 16 and a main frame 18 assembled to enclose the furnace 12. A sheet of grass G is conveyed through the furnace 12 on a horizontal roller conveyor 19 while being heated by the electric heaters 14, 16 to its deformation temperature. Suspended from the main frame 18 is an apparatus, generally indicated at 20, for locally heating selected portions of the glass sheet G.

In the illustrated embodiment, the apparatus 20 is comprised of four units 22 (only two units are shown) of identical structure except that one is a mirror image of the other, i.e., one is for the left side, rather than for the right side. One of the units 22 is shown, on an enlarged scale, in FIG. 2. Each unit 22 includes two spaced vertically extending members 26, 26, the upper ends of which being interconnected by a generally transversely extending member 28. Each of the vertical members 26, 26 has at one end a guide 30 through which a rod or bar 32 extends in parallel relation to the vertical member 26. The rods 32 are interconnected at its upper ends by an upper connecting member 34 and its lower ends by a lower connecting member 36.

Figure 2:
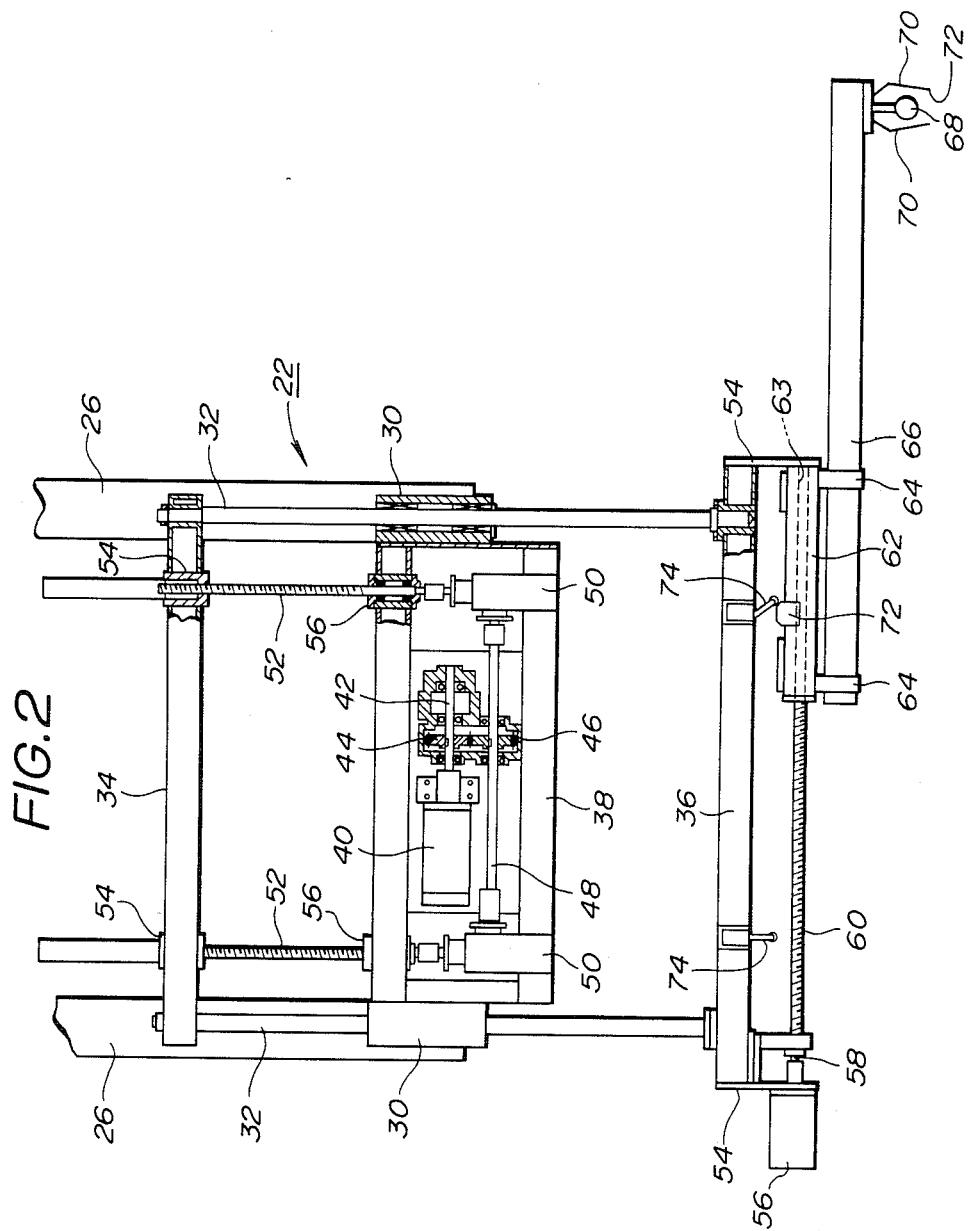
FIG. 2 is an enlarged view, partly in section, of one of the units in an apparatus for providing localized heating of glass sheets, shown in FIG. 1.

Connected between the guides 30, 30 is a mounting frame 38 on which a motor 40 is mounted. As best seen in FIG. 2, the motor 40 has an output shaft 42 onto which a drive gear 44 is fixedly mounted. The drive gear 44 is in meshing engagement with a driven gear 46 which is, in turn, fixedly mounted onto a driven shaft 48 extending in parallel to the drive shaft 42. The driven shaft 48 has opposite ends rotatably supported through suitable bearing assembly (not shown) within two corresponding gear cases 50, 50, and operatively connected to two externally threaded first shafts 52, 52 respectively, through a plurality of gears (not shown) mounted within the gear cases 50, 50. Each of the first shafts 52, 52 extends vertically through internally threaded upper and lower guides 54, 56. With this arrangement, actuation of the motor 40 causes the drive shaft 42 to rotate and this rotation is then transmitted to the driven shaft 48 through the gears 44 and 46. Upon rotation of the driven shaft 48, the externally threaded shafts 52, 52 are rotated, for instance, in a clockwise direction. This causes the rods 32, and thus, the lower connecting member 36 to move downwards. Reverse rotation of the shafts 52, 52 will move them upwards.

The lower connecting member or vertically movable member 36 has brackets 54, 54 at its opposite ends. A motor 56 is mounted to one of the brackets 54, 54 and has an output shaft 58, the free end of which being connected to one end of an externally threaded second shaft 60 extending in a direction transversely to the direction of conveyance of the glass sheet G. The other end of the second shaft 60 is rotatably supported by the other bracket 54. Reference numeral 62 indicates a transversely movable body 62 having an internally threaded bore 63 through which the second shaft 60 extends. Attached through brackets 64, 64 to the lower surface of the transversely movable body 62 is a supporting member 66 having its free end extending through a vertical slot 67 formed at both sides of the furnace 12 into the interior thereof and supporting one end of an elongated localized heater 68. The other end of the elongated localized heater 68 is supported by the supporting member 66 of the adjacent unit. The localized heater 68 is covered by two cover members 70, 70 so that heat is radiated only through an opening 72 to the upper surface of the glass sheet G. With this arrangement, actuation of the motor 56 causes the second shaft 60 to rotate, for instance, in a clockwise direction. Upon this rotation of the second shaft 60, the transversely movable body 62, together with the supporting member 66 and the localized heater 68, is moved toward the glass sheet G in a direction transeversely to the direction of conveyance of the glass sheet G. Counterclockwise rotation of the second shaft 60 causes the localized heater 68 to move in a direction away from the glass sheet G. Transverse movement of the movable body 62 is limited when an operating member 72 mounted on the transeversely movable body 62 is brought into contact with two longitudinally spaced limit switches 74, 74 positioned on the lower surface of the vertically movable member 36.

Figure 3:
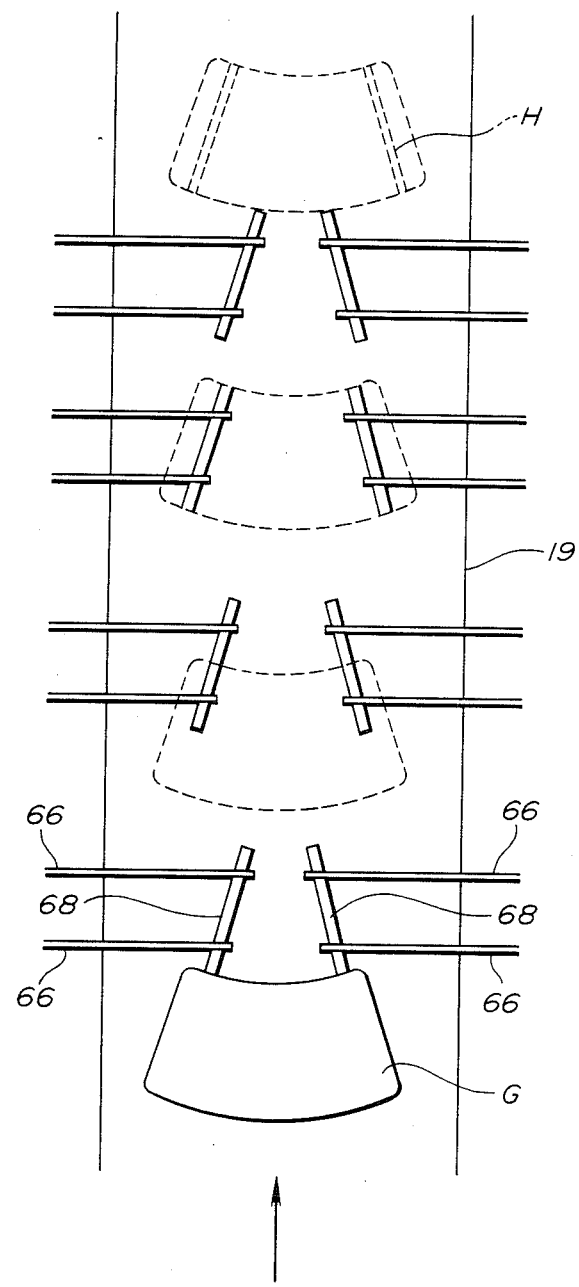
FIG. 3 is a schematic view showing the manner in which a sheet of glass is locally heated by a pair of localized heaters of the apparatus shown in FIG. 2.

Operation will simply be explained with reference to FIG. 3 wherein the sheet of glass G is conveyed in the direction of the arrow. When the glass sheet G is not yet conveyed below the localized heaters as indicated at (A), that is, the localized heaters 68, 68 are in a waiting position, the distance between the heaters 68, 68 is minimum. The heaters 68, 68 are then moved away from each other, as indicated at (B) and (C), in a direction transversely to the direction of conveyance of the glass sheet G. At this time, the movement of the heaters is effected in a substantially synchronized relation to the movement of the conveyed glass sheet G, so that the width of a given portion to be locally heated, as indicated at H, must be equal to the diameter of the heater 68 or the width of the opening 72. After the localized heating is completed, the heaters 68, 68 are moved toward each other as indicated at (D) and back to the initial or waiting position. It will be noted that temperature of localized heat may be adjusted by vertically moving the supporting member 66 along the elongated slot 67 in the furnace 12.

After the given portion has been locally heated at a higher temperature than the rest of the glass sheet G, it is transferred to a bending station (not shown). The glass sheet is then sag bent or press bent to a desired curvature, radius of which is much smaller than that of the rest of the glass sheet.

In the illustrated embodiment, four units 20 are provided, two on one side and the other two units on the other side of the furnace 12. Alternatively, two units 20 may be provided, one on one side and the other unit on the other side of the furnace 12. Also, as a localized heating means, either an electric heater or gas burner is used.

It is to be understood, therefore, that the forms of the invention shown and described are to be taken as preferred embodiments only of the same and that various changes in the shape, number and arrangement of the parts may be resorted to without departing from the spirit and scope of the invention.

What is claimed is:

1. In a glass sheet heating system including a furnace adapted to heat glass sheets to its deformation temperature, and means for conveying said glass sheets through said furnace, the improvement comprising:

one or more heaters positioned within said furnace; and means for reciprocatingly moving said heaters in a direction transversely to the direction of conveyance of the glass sheets in a substantially synchronized relation to movement of said conveyed glass sheets, so that selected portions of the glass sheets are locally heated by said heaters.

2. In a glass sheet heating system including a furnace through which a series of glass sheets are conveyed on a horizontal roller conveyor and are heated to its deformation temperature, the improvement comprising:

one or more elongated heaters positioned within said furnace;

supporting members extending into said furnace and supporting each of said elongated heaters; and means for reciprocatingly moving said elongated heaters supported by said supporting members in a direction transversely to the direction of conveyance of the glass sheets in a substantially synchronized relation to movement of the conveyed glass sheets, so that selected portions of the glass sheets are locally heated at a higher temperature than the rest of the glass sheets.

3. An apparatus for locally heating selected portions of glass sheets conveyed through a furnace, comprising:

one or more localized heaters positioned within said furnace;

supporting members for supporting said localized heaters, at least one portion of each of said supporting members extending into said furnace; and means positioned externally of said furnace and for reciprocatingly moving said localized heaters supported by said supporting members in a direction transversely to the direction of conveyance of the glass sheets in a substantially synchronized relation to movement of said conveyed glass sheets so that said selected portions of the glass sheets are locally heated by said localized heaters.

4. The apparatus of claim 3, wherein said furnace has at its opposite sides elongated vertical slots through which said supporting members are inserted into said furnace, and said supporting members are movable vertically by said means along said slots of the furnace, respectively.

* * * * *